Jan. 5, 1943.   L. G. MORTEN   2,307,230
ELECTRICITY CONDUCTOR UNIT
Filed Dec. 29, 1939   2 Sheets-Sheet 1
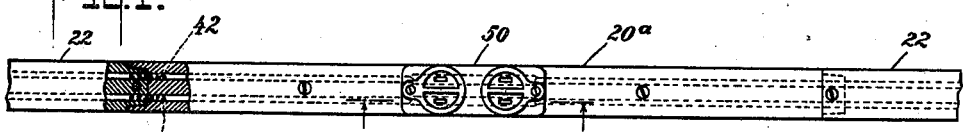
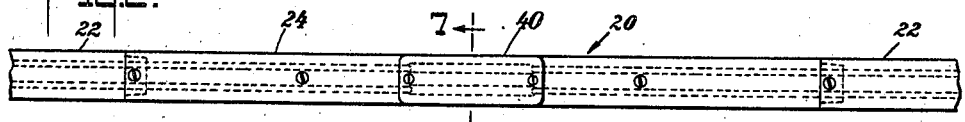
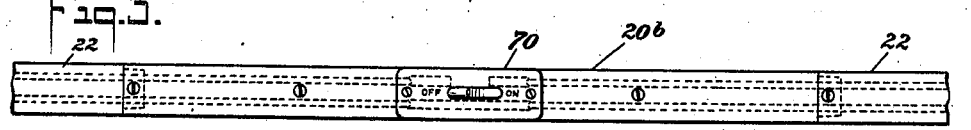
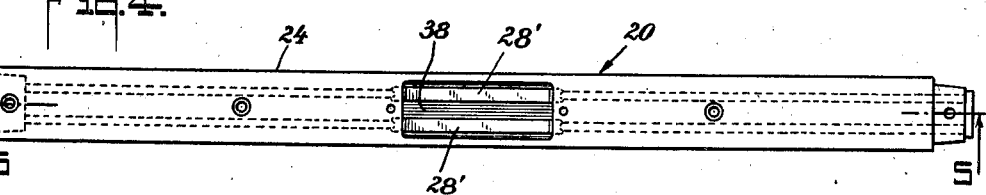
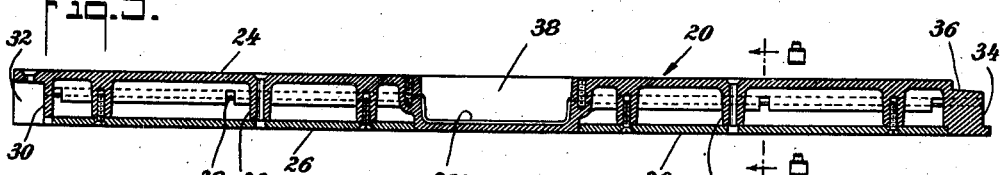
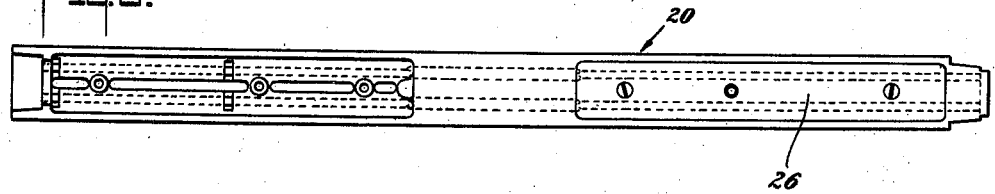
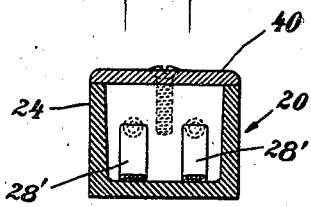
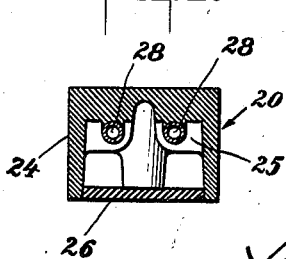
INVENTORS:
Louis G. Morten
Joseph F. O'Brien
ATTORNEY Jan. 5, 1943.  L. G. MORTEN  2,307,230
ELECTRICITY CONDUCTOR UNIT
Filed Dec. 29, 1939  2 Sheets—Sheet 2
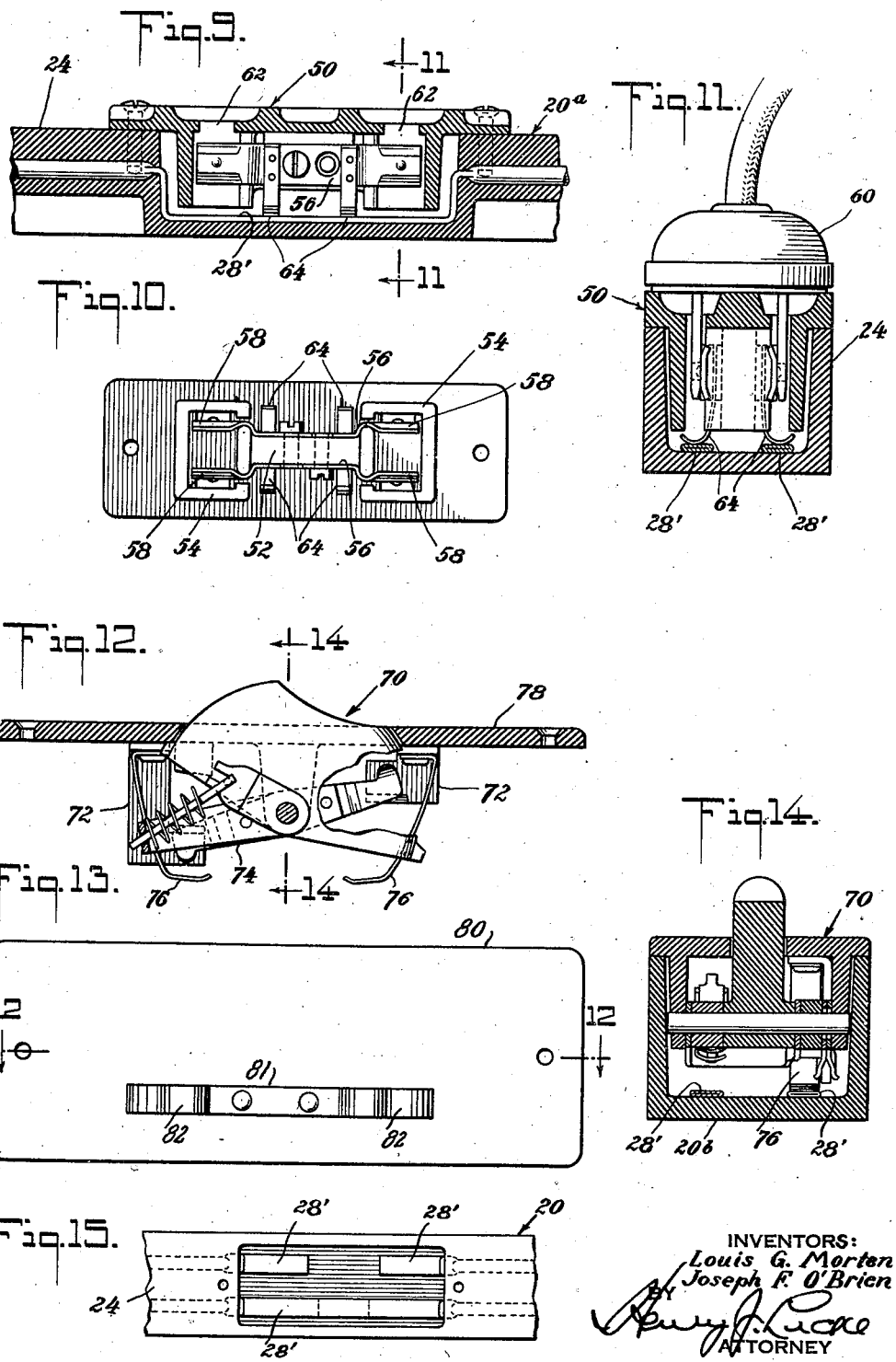

Patented Jan. 5, 1943

2,307,230

UNITED STATES PATENT OFFICE 2,307,230

ELECTRICITY CONDUCTOR UNIT

Louis G. Morten, Teaneck, and Joseph F. O'Brien, Jersey City, N. J., assignors to John B. Pierce Foundation, New York, N. Y., a corporation of New York Application December 29, 1939, Serial No. 311,456

3 Claims. (Cl. 173—334.1)

The present invention relates to improvements in electric wiring systems embodying standardized conductor-carrying units arranged in seriatim mechanical and electrical connection.

In particular, the invention relates to an improved conductor-carrying unit embodying means whereby such unit may be altered, at will, from a "blank" unit to one embodying electric outlet means, switch means, or like specialized utility.

It is an object of the invention to provide an electric conductor-carrying unit convertible at will, and at the place of installation, from simple conductor-carrying status to outlet provided or switch provided status.

It is a further object of the present invention to provide a conductor-provided unit which may be installed either as a single component of a run of conductor-carrying units or which may, per se, be employed plurally in an electric wiring system, to afford means whereby any desired number of convenience outlets may be used, or in which, after the installation of such wiring system, the said wiring system may be broken up into sections which may be electrically isolated through suitable provision of switch means.

The present invention contemplates an electric wiring system comprising a plurality of conductor-carrying units of standard length, electrically and mechanically interconnected to form a single continuous wiring circuit. One or more of the conductor units of such system may be provided with a "well" portion having cover means affording access to the otherwise completely enclosed and inaccessible conductors within such unit. Advantageously, the conductor means of such unit at the stated well portion are suitably configurated to afford optimum opportunities for the connection therewith of switch means or outlet means, while insuring desired insulation facilities.

The present invention contemplates the substitution for such well-cover means of outlet means arranged for electrical connection with the conductor means within such well unit or alternatively, the substitution for such cover means of electric switch means in connection with which a simple alteration of such well unit conductors affords the transformation of such "blank" conductor unit into a switch-provided conductor unit.

By means of the present invention, therefore, an electric wiring system of the class described may be installed in a room or other structure intended for later sub-division or conversion to a specialized purpose, such as possible conversion of a large room into a group of partitioned offices or the like, and it is not necessary that the installer be informed as to the ultimate sub-division of the room to enable him to place the required number of electrical outlets or electric switches.

In the event of sub-division of such space into a number of units in each of which it is desired to provide for electric outlet means, units of the wiring system embodying the present invention may, as occasion arises, and without interruption of the wiring system, be adapted to include the desired electric outlet. Similarly, the electric wiring system may be provided with switch means at advantageous locations, the inclusion of such switch means necessitating only that the electric circuit be temporarily "killed" and a break made in the the electrical conductor means in the "well" of a predetermined well-provided conductor unit.

Other features and advantages will hereinafter appear.

Figs. 1 to 3, inclusive, are plan views of a portion of an electric circuit comprising electricity conductor units interconnected in seriatim, the central unit in each figure embodying the present invention. In Fig. 1, the central unit has been converted to an outlet-provided unit, in Fig. 2 the central unit is in its original, i. e., non-altered form, and in Fig. 3 the central unit has been converted into a switch-provided unit;

Fig. 4 is an enlarged plan view of a conductor unit embodying the present invention, showing the connection well and the conductors therein;

Fig. 5 is a sectional elevation of the unit of Fig. 4, taken on lines 5—5 of Fig. 4;

Fig. 6 is a bottom view of the underside of the unit of Fig. 5, one of the base closure panels having been removed;

Fig. 7 is an elevation taken on section lines 7—7 of Fig. 2;

Fig. 8 is an elevation taken on section lines 8—8 of Fig. 5;

Fig. 9 is an enlarged sectional elevation, taken on lines 9—9 of the outlet-provided unit of Fig. 1;

Fig. 10 is a bottom plan view of the underside of the outlet means of Figs. 1 and 9;

Fig. 11 is a section taken on section lines 11—11 of Fig. 9, but including an attachment plug in operative position;

Figs. 12 and 14 are respectively an elevation, partly in section of the switch unit means of Fig. 3, and a vertical cross section of such switch unit means, the section lines of Fig. 12 indicating the position of such sectional view;

Fig. 13 is a bottom plan view of a jumper unit applicable for replacement of a switch unit should it be desired to eliminate the switch from the electric wiring system; and Fig. 15 is a view of the connection well of the central unit of Fig. 1, a conductor thereof having been severed to permit installation of the switch unit means.

Figs. 1 through 3 inclusive, show portions of an electric wiring system embodying electricity conductor units mechanically and electrically interconnected in seriatim. Such units, including those shown fragmentarily, may be of standardized lengths.

The central unit 20 of Figure 2 embodies the basic unit embodying the present invention; such unit will hereinafter be referred to as a "blank" unit. Unit 20a of Fig. 1 has been converted from "blank" status to outlet-provided status, whereas unit 20b of Fig. 3 has been converted from "blank" status to switch-provided status.

The conductor units mechanically and electrically interconnected with units 20a, 20, and 20b respectively of Figs. 1 through 3, have been uniformly designated 22, although it will be obvious that a wiring system may consist entirely of units 20, left "blank" or suitably converted to outlet-provided or switch-provided status as required.

Referring to Figures 4 through 6, the unit 20 is preferably of hollow construction, in which an outer shell 24 desirably formed from suitable moldable plastic having adequate electrical insulation properties, combines with base panels 26, which may be of moldable plastic, rubber, or other suitable insulation material. Within the said unit 20, and suitably removably secured therein by bridge-like members 25 of shell 24, are electricity conductor means 28, desirably tubes of copper, brass, or equivalent conductive material. Such conductors 28 are coextensive with the principal end faces of the conductor unit; as shown in Figure 5 such principal end faces include face 30 forming the inner transverse wall of a female socket joint 32, and end face 34 which forms an end face of a male extension end 36 configurated and adapted for male and female interconnection with adjacent conductor units, as indicated in Figures 1 through 3.

Disposed at any suitable position along the length of such unit 20, but preferably centrally disposed therein, is a well 38, said well being wholly enclosed by walls and base of electrical insulation material. As shown in Figure 5, the conductor means 28 may be flattened in the zone of the said well, and formed in such manner as to follow the sides and base of the well. For convenience, such portions of conductor means 28 are designated 28'. As is indicated in Figures 4 and 7, said conductor portions 28', 28' are suitably spaced from the side walls of the upper shell portion 24, to afford adequate provision for the insulation of such conductor units.

In "blank" status, see Fig. 2, the well is covered with insulating cover plate means 40, such cover plate means having a snug fit with the upper surface of the shell 24 and suitably removably secured thereto, as by the illustrated machine screws. It is apparent, therefore, that in a blank unit or a run of blank units, the conductors thereof are adequately electrically insulated both within and without.

As shown in Figure 1, the seriatim-connected units 22, 20a, 22 may be electrically interconnected through the agency of the illustrated conductive pin means 42, 42; the male projection end of left-hand unit 22 interfits with the socket of unit 20a, and the male projection end of unit 20a is positioned within the socketed end of right-hand unit 22. By the illustrated screw passages, the passage of a screw through outer shell at the socketed end of each unit passes through the male projection end of the adjacent unit, whereby interconnected units may be securely mechanically fastened.

It is a feature of the present invention that the blank units 20 are convertible into other forms suitable for an electric wiring system, such forms including, but not being restricted to, an outlet unit 20a and a switch unit 20b. It will be obvious to those skilled in the art that such blank units may be converted to fuse-provided units, when desired.

Treating first of the outlet-provided unit 20a, Figure 9 illustrates an enlarged sectional view of such unit at the outlet portion thereof. The outlet means may desirably include a cover 50, of electrical insulation material, said cover 50 having screw passages at its terminal ends, the center to center distance of such screw passages matching the like screw passages in outer shell 24, and affording the opportunity of securing such cover 50 to the body of unit 20a by the illustrated machine screws.

Cover means 50 may include suitable wall structures depending therefrom, said wall structures comprising a central rib 52 and contact housings 54, 54. The contact means of such outlet 50 may comprise longitudinally arranged conductors 56, 56, mounted respectively on either side of the rib 52 and screw-threadedly or otherwise suitably secured thereto. The termini of each such conductor 56 afford spring contact means 58 with which the blades of a convenience plug 60, see Fig. 11, engage when such blades are passed through the access slots 62 of the outlet unit.

For effecting an electrical contact of the outlet conductor means 56 with the unit conductor means 28', any suitable means may be employed, one form of such means being illustrated as the paired spaced resilient contacts 64, 64, each pair of which is in electrical connection with the associated conductor 56. Such contacts 64 are desirably curved at their terminal ends as shown in Figure 11, and are of such length that when the unit 50 is inserted into the well and secured to cover means 24 of the unit 20a, the curved ends of contacts 64 are strongly resiliently urged into engagement with the conductors 28', and, during the course of insertion into the wall portion, exert a "wiping" contact with the flattened conductor means 28'.

As is apparent from Fig. 9, each pair of contacts 64 engages with its related conductor 28' at suitably spaced locations, the spacing being adequate to permit a portion of conductor 28' intermediate paired contacts 64 to be removed as later described.

It is apparent, therefore, that a blank unit 20 is readily convertible into an outlet unit merely by the removal of its cover plate 40 and the substitution therefore, of an outlet-provided cover means 50.

Figure 12 illustrates a form of switch means which may be installed in a blank unit should it be desired to include switching means in the electrical circuit embodying such blank unit. In the form illustrated in Figure 12, the switch 70 is of the single pole type and is illustrated as being of a toggle form, such form lending itself best to installation in a unit 20. The operation of a toggle switch mechanism being well known, it is not considered necessary to amplify it here; however, it should be noted that the electric contact posts 72, 72 of such switch, the current connection between said posts being effected by the pivoted switch blade 74, are provided with springable contact elements 76, 76, said contact elements being disposed in the same plane and in the plane of one of the conductor elements 28' of the blank unit 20. As shown in Figure 15, it is necessary to remove an intermediate portion of one of said conductors 28', the extent of such removal being adequate to insure entire freedom from the possibility of an electric circuit arcing or jumping across the gap.

The cover plate means 78 of such switch unit is provided with the illustrated screw holes, it being understood that the spacing of the stated screw holes corresponds to the spacing of the screw holes in the cover 24 of the unit 20, whereby the cover plate 78 and its therewith associated switch mechanism may be mounted in operative position. As illustrated in Figure 14, the spring contact means 76 makes contact with both portions of the gap-provided conductor 28, such contact preferably being stiffly resilient, and at its inception of a "wiping" nature, to improve the electrical conduction from each of the portions of conductor 28' to the respective spring conductor means 76.

It will be apparent that a double-pole switch may be employed if desired, such double-pole installation contemplating that both of the conductors 28' in the blank unit 20 will be operated upon the removal of a central portion thereof.

To facilitate the cutting of the conductors 28', and to establish a uniform gap between the cut ends of each conductor 28', said conductors may be scored, as illustrated in the uncut conductor 28' of Figure 15. The cutting of such conductors 28' is readily effected by sharp-nose cutting pliers, or the like.

Should it be desired to remove switch unit 70, the unit 20 may be restored to operative status by suitable jumper means, such as illustrated in Fig. 13, wherein cover plate 80 has secured to its underside, a bus-bar 81; the terminals 82, 82 thereof may be of springable metal, desirably having a shape similar to spring conductor means 76, 76 of switch unit 70.

Similarly, switch unit 20b may be converted to an outlet unit 20a, by the substitution of an outlet unit 50 for switch unit 70, the spacing of the paired contacts 64 serving to bridge the gap formed in conductor 28', to complete the electrical circuit.

Whereas we have described our invention by reference to specific forms thereof, it will be understood that many changes and modifications may be made without departing from the spirit of the invention.

We claim:

1. An electricity conductor unit for use per se as an element of a continuous electric circuit or optionally as a take-off or switch element of such circuit, comprising a body of electric insulation material having a well portion disposed intermediate the ends of the body, a plurality of rigid electricity conductors extending continuously longitudinally therein and secured within said body in mutually insulated spaced relationship at locations remote from said well portion, said electricity conductors within said well having exposed surfaces of such length that a substantial portion of any of said conductors within said well may be severed to interrupt the electric circuit while maintaining the securement of said conductors, and means for removable securement to said body at the well portion thereof for closing said well portion.

2. An electricity conductor unit as recited in claim 1, wherein said removable well closure means include a take-off having spaced electric contacts at at least one pole thereof for engaging one of said electricity conductors at relatively widely spaced locations, whereby electric circuit may be completed through said conductor in the circumstance that a portion of the same had been severed.

3. An electricity conductor unit as recited in claim 1, wherein said removable well closure means includes electric switch means having spaced electric contacts at at least one pole thereof for engaging one of said electricity conductors at relatively widely spaced locations, whereby electric circuit may be optionally made or broken through said conductor in the circumstance that a portion of the same had been severed.

LOUIS G. MORTEN.
JOSEPH F. O'BRIEN.